United States Patent Office 3,526,588
Patented Sept. 1, 1970

3,526,588
MACROMOLECULAR FRACTIONATION PROCESS
Alan S. Michaels, Lexington, and Richard W. Baker, Cambridge, Mass., assignors to Amicon Corporation, Lexington, Mass., a corporation of Massachusetts
No Drawing. Filed Sept. 21, 1967, Ser. No. 669,385
Int. Cl. B01d 13/00
U.S. Cl. 210—23                            8 Claims

ABSTRACT OF THE DISCLOSURE

A process for fractionating macromolecular mixtures such as mixtures of polymers of varying molecular weight, e.g. solutions of polyvinylpyrrolidone having molecular weights extending from well below 10,000 to well above 100,000; the process comprises subjecting solutions of the macromolecular mixtures to a pressure differential, and thereby preferentially forcing a particular molecular weight fraction through a selected class of pressure-sensitive, anisotropic microporous membrances of the type described. A particularly advantageous embodiment of the invention is based on the discovery that physiologically-harmful components of polyvinylpyrrolidone can be removed from the commercially-available polymer by the process of the invention.

BACKGROUND OF THE INVENTION

There are a number of reasons why it is desirable to fractionate, according to molecular weight, mixtures of macromolecules. One, of course, is to obtain samples of macromolecular materials which have relatively small molecular weight distribution and therefore are useful in scientific studies designed to relate the effect of molecular weight to the other properties of the material or to properties of compositions including the material as a component thereof.

A great many such studies have been carried out in the various branches of the chemical art. Among the results of the studies made in the medical area, has been the determination that large molecular weight components of polyvinylpyrrolidone substantially destroy the utility of this material as a blood extender. Methods previously known to the art, i.e., solvent fractionation and gel chromatographic techniques, for removing these higher-molecular components have been costly, time-consuming, and cumbersome; for these reasons, the use of polyvinylpyrrolidone as a blood extender has been largely abandoned.

Thus it is an object of the present invention to provide an efficient, low-cost and highly-effective process for fractionating mixtures of macromolecular materials.

Another object of the invention is to provide a process for carrying out such separations at reasonable rates while subjecting the chemicals being processed to the mildest physical conditions which are possible.

It is a particular object of the invention to provide means for making polyvinylpyrrolidone suitable for use as a blood extender. This object has been accomplished by the discovery that a new kind of microporous, anisotropic, polymeric membrane exhibit porosity characteristics by which varying molecular weight fractions of a macromolecular mixture can be made to permeate the membranes.

SUMMMARY OF THE INVENTION

These objects have been substantially achieved with the discovery that the transport properties of selected membranes are so sensitive to pressure that they can reject and pass various molecular-weight fractions at good flow rates, when utilized under various pressure conditions. The membranes useful in the process of the invention are described and claimed in the co-pending U.S. patent application Ser. No. 755,320 (having the same assignee as the above), filed Aug. 26, 1968 in the name of Alan S. Michaels, entitled "High Flow Membrane," which is a continuation-in-part of Ser. No. 669,648, filed Sept. 21, 1967, and now abandoned. These membranes are fluid permeable, highly anisotropic, submicroscopically porous, membranes formed of polymers having good mechanical integrity, most advantageously those crystalline and/or glassy thermoplastic polymers known to the art. By crystalline and glassy polymers are meant those materials which possess from about 5 to 50% by weight crystallinity as measured by X-ray diffraction techniques known to the art and/or a glass transition temperature ($T_g$) of at least about 20° C. Particularly advantageous are polymers of inherently low water sorptivity which, unlike the cellulose acetate materials known to the membrane art, may be allowed to dry during storage without losing their beneficial mechanical and processing characteristics. These polymers are those having water-absorptivities of less than about 10% by weight of moisture at 25° C. and 100% relative humidity.

The anisotropic membranes useful in the fractionation processes of the invention are prepared by:

(1) forming a casting dope of a polymer in an organic solvent
(2) casting a film of said casting dope
(3) preferentially contacting one side of said film with a diluent characterized by a high degree of miscibility with said organic solvent and a sufficiently low degree of compatibility with said casting dope to effect rapid precipitation of said polymer, and
(4) maintaining said diluent in contact with said membrane until substantially all said solvent has been replaced with said diluent.

Such submicroscopically porous anisotropic membranes consist of a macroscopically thick film of porous polymer, usually more than about 0.002 and less than about 0.050 of an inch in thickness. One surface of this film is an exceedingly thin, but relatively dense barrier layer of "skin" of from about 0.1 to 5.0 microns thickness of microporous polymer in which the average pore diameter is in the millimicron range, for example from 1.0 to 500 millimicrons—i.e., about one-tenth to one hundredth the thickness of the skin. The balance of the film structure is a support layer comprised of a much more coarsely porous polymer structure through which fluid can pass with little hydraulic resistance. When such a membrane is employed as a "molecular filter" with the "skin-side" in contact with fluid under pressure, virtually all resistance to fluid flow through the membrane is encountered in the "skin," and molecules or particles of dimensions larger than the pores in the "skin" are selectively retained. Because the skin layer is of such extraordinary thinness, the over-all hydraulic resistance to fluid flow through the membrane is very low; that is, the membrane displays surprisingly high permeability to fluids. Furthermore, tendency of such membranes to become plugged or fouled by molecules or particles is surprisingly low. It is the discovery that the effective pore size of this skin is controllably modified by the application of pressure thereto that is the basis of the instant invention.

Film-forming polymers useful in forming membranes useful in the process of the invention include, but are not limited to, the following:

Polycarbonates, i.e. linear polyesters of carbonic acids in which carbonate groups recur in the polymer chain, by phosgenation of a dihydroxy aromatic, such as bis-phenol A. Such materials are sold under the trade designation Lexan by the General Electric Company.

Polyvinylchlorides; one such material is sold under the trade designation Geon 121 by B. F. Goodrich Chemical Company.

Polyamides such as polyhexamethylene adipamide and other such polyamides popularly known as "nylon."

Modacrylic copolymers, such as that sold under the trade designation Dynel and formed of polyvinyl chloride (60%) and acrylonitrile (40%), styrene-acrylic acid copolymers and the like.

Polysulfones such as those of the type characterized by diphenylene sulfone groups in the linear chain thereof are useful. Such materials are available from Union Carbide Corporation under the trade designation P-1700.

Halogenated polymers such as polyvinylidene fluoride sold under the trade designation Kynar by Pennsalt Chemical Corporation, polyvinylfluoride sold under the trade name Tedlar by E. I. du Pont de Nemours & Co., and the polyfluorohalocarbon sold under the trade name Aclar by Allied Chemical Corporation.

Polychloroethers such as that sold under the trade name Penton by Hercules Incorporated, and other such thermoplastic polyethers;

Acetal polymers such as the polyformaldehyde sold under the trade name Delrin by E. I. du Pont de Nemours & Co., and the like;

Acrylic resins such as polyacrylonitrile polymethyl methacrylate, poly n-butyl methacrylate and the like;

Other polymers such as polyurethanes, polyimides, polybenzimidazoles, polyvinyl acetate, aromatic and aliphatic, polyethers, and the like may also be utilized.

The large number of copolymers which can be formed by reacting various proportions of monomers from which the aforesaid list of polymers were synthesized, are also useful for preparing membranes according to the invention. This statement of course applies only to those copolymers whose crystallinity and/or glassy characteristics are suitable for fabrication of the novel membranes described herein.

Perusal of the above illustrative list of polymers operable in the present invention will reveal that, as a general rule, relatively polar polymeric materials are preferred. This is true primarily because it is an easier task to select operable systems of non-hazardous solvents, co-solvents, and economical wash fluids when polar polymers are used. In general, non-polar polymers such as polyethylene require a more exotic system of solvents, and consequently are not as conveniently adapted for economic and safe operation of the process. Nevertheless, they can be utilized in practice of the invention when required to provide a membrane of particular characteristics.

In general, preferred polymers for membranes used in the invention are those which exhibit modest levels of crystallinity at ambient temperatures, e.g., between about 5% to 50% crystallinity as measured by X-ray diffraction analysis and/or those which display relatively high glass transition temperatures, (e.g., at least 20° C., and preferably higher). Polymers meeting these requirements, as a rule, yield membranes with good mechanical strength, resistance to collapse at elevated pressures, and good long-term stability at elevated temperatures.

Solvents will generally be chosen for their ability to form a film-forming casting dope with the polymer from which a membrane is to be prepared. A degree of solubility of at least about 5% by weight of the polymer in the solvent is usually required. Thickening agents may be added to the casting dope to provide viscosity necessary for casting, but such agents will usually affect liquid flow rate through the resulting membrane.

The art provides a number of useful approaches to selection of particular solvent systems for particular polymers. The Polymer Handbook edited by Brandup and Immergut (John Willey and Sons, New York, 1966) provides some especially helpful chapters. Particular attention is called to the chapters entitled "Solvents and Nonsolvents for Polymers" by Klaus Meyerson and "Solubility Parameter Values" by H. Burrell and B. Immergut in addition to the large quantity of other data contained in Section IV of this work. Further aid in selecting appropriate polymer-solvent mixtures is provided in the Journal of Paint Technology, Volume 38, May 1966, by Crowley et al. in an article entitled "A Three-Dimensional Approach to Solubility" and in the Journal of Paint Technology, Volume 39, No. 505, February 1967, by Hansen in an article entitled "The Three-Dimensional Solubility Parameter—Key to Paint Component Affinities."

Study of these references will inform one skilled in the art of numerous solvents which can be selected with a view to cohesive energy density (as defined by so-called Solubility Parameter), hydrogen bonding tendency, and polarity for use with a given polymer system. In general it may be stated that the higher the solvency of a given system for a polymer, higher flux rates will be attainable with membranes cast from a casting dope of given concentration.

Among the many specific polymer-solvent systems which applicant has found to be useful in forming casting dopes are the following:

TABLE I

| System No. | Polymer | Solvent |
|---|---|---|
| 1 | Acrylonitrile (40)-vinyl-chloride (60) copolymer (Dynel). | N,N'-dimethylformamide (DMF). |
| 2 | Acrylonitrile (40)-vinyl-chloride (60) copolymer. | Dimethylsulfoxide (DMSO). |
| 3 | do | N-methyl-pyrrolidone. |
| 4 | do | Dimethylacetamide (DMAC). |
| 5 | Polyacrylonitrile | DMF. |
| 6 | do | DMAC. |
| 7 | Polysulfone | N-methyl pyrrolidone. |
| 8 | do | N,N'-dimethylpropionamide. |
| 9 | Polyvinylchloride | DMF. |
| 10 | do | DMAC. |
| 11 | Polyvinylidene chloride | DMF. |
| 12 | Polycarbonate | DMF. |
| 13 | Polystyrene | DMF. |
| 14 | Poly n-butyl methacrylate | DMF. |
| 15 | Polymethylmethacrylate | DMF. |
| 16 | Polysulfone | Cyclohexanone. |
| 17 | Polymer 360 | DMAC. |
| 18 | do | DMF. |
| 19 | do | DMSO. |
| 20 | Polyacrylonitrile | 70% $ZnCl_2$ (aqueous). |

Casting dopes prepared from the above list of polymers and solvents may be used directly and processed at very moderate temperatures, usually 25° C. to 90° C., to cast useful and highly selective membranes.

Examples of these are the polyvinylchloride, polycarbonate, and acrylonitrile-vinylchloride polymers when each is formed into a dope with DMF. However, usually the pore-structure of the membranes can be further modified by the addition of a "solution-modifier" and/or by the further moderate increases in the temperature of the casting and wash operations, and/or by changes in polymer concentration in the casting dope.

Solution modifiers are often advantageously selected to increase the solvating effect of the overall solvent system compatibility. Such a solution modifier will tend to loosen, i.e., decrease the rejection efficiency of a membrane at a given molecular size cut-off level. By "increased solvating effect" is meant an increase in compatibility or the degree of proximity to formation of an ideal solution.

Conversely, a solution-modifier which reduces the solvating effect of the overall solvent system tends to increase rejection efficiency but to decrease the flux rate of a membrane at a given "molecular-size" cut-off level.

To illustrate this with respect to making a Dynel membrane with water as the diluent and DMF as the primary solvent:

DMF has a solubility parameter (cal./cc.) ½ of 12.1 and is a strong to medium hydrogen bonding solvent, and has a dipole moment of 2. Water has a solubility parameter of 23.4, is a strong hydrogen bonding solvent, and has a dipole moment of about 1.8.

Thus a solution modifier used in the process of the invention and having a solubility parameter of 10.0, medium hydrogen bonding tendency, and a dipole moment of 2.9 would be expected to decrease the solvating effect on Dynel and thus would tend to "tighten" the Dynel membrane. Such is the case with acetone used as a solution modifier, for example in the quantity of 5% based on weight of total solvent. Tetrahydrofurane is an example of another such modifier.

On the other hand, a solution modifier having about the same dipole moment as DMF and a strong affinity to water would function more like the $ZnCl_2$ type of inorganic salt to be discussed below, and has sufficiently greater compatibility with water than DMF to "loosen" the membrane, i.e., increase the flux attainable across the membrane at a given pressure. Such is the case with formamide used as a "solution-modifier," for example in the quantity of 5% based on the weight of the total solvent. This is in spite of the fact that bare reference to the solubility parameter of formamide would lead one to believe that its use would result in a poorer solvent for Dynel and, consequently, a more retentive membrane.

In general, a large number of such solution modifiers can be selected for a given polymer-solvent system. The selection can be made, not only from the classical lists of organic solvents, but also from solid organic compounds which may be solubilized in the primary solvents.

Another class of solution modifiers are the inorganic electrolytes dissociable in organic solutions, for example many halides, nitrates and the like. Some such compounds are $FeCl_3$, LiBr, LiCl, $Al_2(NO_3)_2$, $CuNO_2$ and NaCNS and the like. These materials tend to have a solvating effect on polar polymers and tend to increase the flux rate attainable with membranes cast from solutions in which they are incorporated as solution modifiers. Some such inorganic electrolyte solution modifiers particularly useful in the systems described in Table I include those exemplified by the list in Table II below.

TABLE II

| System | Solution modifier | System | Solution modifier |
|--------|-------------------|--------|-------------------|
| 1 | $ZnCl_2$ | 2 | $ZnCl_2$ |
| 1 | $FeCl_3$ | 4 | $LiNO_3$ |
| 1 | LiBr | 6 | LiCl |
| 1 | $(Al)_2(NO_2)_3$ | 11 | $ZnCl_2$ |
| 1 | NaCNS | 12 | $ZnCl_2$ |

The effect of these salts which act as solvating aids for polymers is quite different when they are incorporated in the diluent as will be discussed later in this specification.

Organic and other liquid solution modifiers particularly useful in the systems described in Table I include those exemplified by the list in Table III below:

Table III

| System: | Solution modifiers |
|---------|--------------------|
| 1 | Tartaric acid. |
| 1 | $H_2O$. |
| 1 | $HCONH_2$. |
| 1 | Dioxane. |

The diluent, as has been stated before, should be compatible with the solution modifier and primary solvent which form the total solvent systems to be leached from a cast membrane. Water, the most convenient diluent will normally be utilized in all systems in which it is operable. Occasionally a mixture of water and an organic solvent will provide a more suitable diluent; in such cases the organic solvent can often be selected from the solution modifier or primary solvent or a mixture of the two.

It is often possible, by means of a quick qualitative analytical test, to judge whether a particular diluent will be suitable for use with a particular casting solution: If the addition of a few drops of a prospective diluent to the casting solution brings about immediate precipitation of the polymer, good membranes can generally be formed.

The polymer solids in the casting solution will preferably range from about 5 to 20% of the polymer-solvent mix. The precise concentration of polymer solids must be high enough to form a good film-forming dope and low enough so that the precipitated membrane does have some pore volume in its barrier layer. If a given solution yields an impermeable membrane, a decrease in concentration usually results in obtaining a permeable microporous membrane.

Process steps which have been discovered to be particularly advantageous in preparation of casting dopes for use in the instant process include the steps of clarifying the casting dope by centrifugal action before drawing films therefrom. This clarification need not be so complete as to, for example, cause the elimination of a Tyndal effect from a casting dope containing inorganic salts. As an alternate to the foregoing procedure, it sometimes is possible to obtain this clarification by pH modification of the casting dope. For example when $ZnCl_2$ is used as in inorganic electrolyte co-solvent, some zinc oxychloride and/or hydroxide appears in the casting dope. A few drops of hydrochloric acid tends to solubilize these salts and greatly lessen the magnitude of Tyndal effect of the casting dope. It is also desirable to keep the casting dope agitated between preparation and use in making film drawdowns. For example, keeping it on a laboratory ball mill between the actual preparation of drawdowns of membranes was found to add significantly to the uniform character of the membranes produced from one drawdown to the other.

Another method for increasing the rejection efficiency of the membranes utilized in the instant invention is to post-treat them in a bath at elevated temperatures. Typical after treatment temperatures will range from 50 to 90° C., alhough higher temperatures may be used to achieve the desired results with some polymers. The time of such after treatment need not be great, usually 10 seconds to 10 minutes will achieve a significant decrease in porosity; the precise time, of course, depends considerably on such factors as temperature selected, wettability of the membrane surface, etc.

DESCRIPTION OF THE PREPARATION OF A MICROPOROUS ANISOTROPIC MEMBRANE FOR USE IN THE PROCESS OF THE INVENTION

A casting dope was prepared by dissolving 13 grams of Dynel and 5 grams of $ZnCl_2$ in 87 grams DMF. This solution was prepared at a temperature of from about 60 to 70° C. Subsequently the solution was drawn down in a .010 film on a glass substrate. Prior to drawdown, tape was placed on the glass along the intended edges of the membrane to assure its continued adherence to the glass plate during washing. This adherence is necessary to avoid the precipitation of a barrier layer on the backside of the membrane. Moreover, the tape aids in minimizing membrane shrinkage in subsequent processing steps.

Next, the drawn film was bathed in a distilled water diluent for 15 minutes at 20° C.

The resulting membrane was a microporous membrane formed of the 60% vinyl chloride-40% acrylonitrile copolymer sold under the trade name Dynel by Union Carbide Corporation. This membrane was characterized by a transport rate to distilled water, of about 250–300 gallons per day per foot[2] at 100 p.s.i.g. Its pore-structure is characterized by the fact that about 30% of a 110,000 molecular weight polysaccharide can be retained in dilute water solutions at operating conditions of about 100 p.s.i.g. and 25° C.

EXAMPLE 1

A 2% aqueous solution was prepared of a polysaccharide, sold under the trade name Dextran 40 by the Pharmacia Co. This polysaccharide has a weight average molecular weight of about 40,000 and a ratio of weight average molecular weight to number average molecular weight of about 2.

The intrinsic viscosity of such a 2% solution (deciliters per gram) is about 0.105.

The solution was placed in a well-stirred pressurized chamber with a membrane of the kind described above, at the bottom thereof. This membrane, i.e., the pores thereof, provided the only exit path from the batch cell. Pressure was applied to the chamber in gradually increasing steps. At each pressure level about 1.2 to 1.4 liters of liquid was collected on the downstream side of membrane 1. This procedure was carried out at about 24° C. and was also used generally in the following examples unless otherwise indicated.

Table 4, following, is indicative of the compositions of the fractions passed through the membrane 1 at various pressures.

TABLE IV

| | Collected fraction of feed, approx. percent | Intrinsic viscosity, dl./g. | Estimated ave. M.W. |
|---|---|---|---|
| Applied pressure, p.s.i.: | | | |
| 5 | 19.5 | 0.082 | 10,000 |
| 10 | 12.5 | 0.087 | 15,000 |
| 20 | 14.5 | 0.103 | ca. 35,000 |
| 40 | 16.5 | 0.109 | ca. 55,000 |
| Feed residue | 36.5 | 0.122 | ca. 90,000 |
| Original feed | | 0.105 | |

This separation was carried out without the operating temperature ever exceeding about 25° C.; therefore the process is demonstrated to be capable of operation with even highly heat-sensitive organic materials.

Inasmuch as the intrinsic viscosity is well understood to be indicative of the relative molecular weight of a given polymer system, those skilled in the art will readily understand that the increasing intrinsic viscosity levels from one pressure to a higher pressure is indicative of an excellent fractionating of the polysaccharide according to its molecualr weight.

To demonstrate this, the average molecular weights of a number of commercial products are listed below with the intrinsic viscosities these products have been demonstrated to possess.

Dextran 110 calibration table

Average molecular weight: Intrinsic viscosity
- 110,000 — 0.131
- 80,000 — 0.117
- 40,000 — 0.105
- 20,000 — 0.098

Comparing the results of the fractionation carried out in Example 1 with the above "calibration table," various molecular weights can be estimated as has been done in Table IV.

EXAMPLE 2

The same process as described in Example 1 was repeated except that an 80,000 molecular weight polysaccharide was substituted for the 40,000 molecular weight material and that a new membrane of the same type as used in Example 1 was placed in the batch cell. Results are tabulated in Table V.

TABLE V

| | Vol percent of feed | Intrinsic viscosity | Prob. mole wt. |
|---|---|---|---|
| Applied pressure, p.s.i.g.: | | | |
| 5 | 6 | 0.078 | <<20,000 |
| 12 | 15 | 0.098 | 20,000 |
| 30 | 8 | 0.125 | ca. 95,000 |
| 60 | 17 | 0.126 | ca. 95,000 |
| Residue | 44 | 0.140 | <120,000 |

Three well-stirred batch cells were placed in series with a membrane of the type used in Example 1 forming the outlet from each cell with the last cell feeding into a collection jar. The first cell was filled with a 2% aqueous solution of Dextran 80, a polysaccharide of 80,000 average molecular weight. The other two cells were filled with water.

A pressure of 40 p.s.i.g. was then exerted across the battery of cells. This, of course, initiated a flow through the membranes. This flow was continued until 7 liters of solution had been collected as filtrate through the last membrane of the series. This filtrate was concentrated by evaporation and its intrinsic viscosity, together with the intrinsic viscosities of solution left in the batch cells were determined as follows:

TABLE VI

| Contents of— | Vol. percent of feed | Intrinsic viscosity |
|---|---|---|
| Cell 1 | 26 | 0.153 |
| Cell 2 | 20 | 0.147 |
| Cell 3 | 44 | 0.111 |
| Filtrate | 5 | 0.086 |
| Original feed | | 0.117 |

Thus it is seen that the process of the invention can be practiced, not only by raising the pressure driving force from time to time on a given membrane, but also by using a series of membranes as in this Example 3. In such cases, especially convenient for continuous processing, the pressure drop across each succeeding membrane will normally be lower than the pressure drop across the preceding membrane. This effect of course, may be varied; for example, pulling a vacuum on the system at the outlet side of the down stream membrane or by providing supplemental pressurizing means on some of the downstream cells.

EXAMPLE 4

A 2% aqueous solution of polyvinylpyrrolidone was charged to a well-stirred batch cell having a microporous membrane, of the type used in Example 1, across the outlet therefrom. A pressure of 30 p.s.i.g. was applied to the solution and about 80%, by volume, of this solution was passed through the membrane as ultrafiltrate.

About 6500 ml. of the ultrafiltrate was collected and thereupon subjected to another pass just as that described in the foregoing paragraph. About 5000 ml. of this twice-filtered material was collected.

The following Table VII shows molecular weight determinations for the residue, (i.e., the polymeric fraction kept in the cell) and the ultrafiltrate (i.e., the polymeric fraction passed through the membrane into the ultrafiltrate) at each step. The table is arranged in the order of decreasing molecular weight as obtained by measurement of intrinsic viscosity.

Table VII

| | Ave. molecular weight |
|---|---|
| Residue Step 1 | 42,000 |
| Residue Step 2 | 24,000 |
| Filtrate Step 1 | 21,000 |
| Filtrate Step 2 | 10,400 |

Clearly, the 2-step filtration through the microporous membrane had a dramatic effect in removing the high-molecular fractions of polymer, those known to be toxic.

In order to remove the very low molecular weight fractions from the filtrate of Step 2, the material was subjected to ultrafiltration with an anisotropic polyelectrolyte-gel type membrane sold under the trade designation UM-3 by Amicon Corporation. This membrane is of the type which is highly water sorptive and susceptible to mass transfer therethrough by kinetic driving forces related to concentration gradients and the like rather than by hydraulic pressure. Cellulose acetate membranes are also of this "kinetic" class. About 2400 ml. of filtrate from Step 2 was charged to a well-stirred batch cell and half of this quantity was passed through the UM-3 membrane. The residue was diluted with distilled water to its original volume and again half of the volume was passed through the UM-3 membrane. This dilution and filtration step was repeated twice again.

The final residue, i.e., that which had four times been purged by filtration of lower-molecular constituents thereof through polyelectrolyte complex resin membrane, had an average molecular weight of about 14,000.

Viscosity values, first obtained by correlation of intrinsic viscosity data, were substantially confirmed by gel chromatography of the polyvinylpyrrolidone fractions on polyacrylamide.

It is emphasized that the particular advantage of the instant process is the fact that high rates of separation of molecular fractions can now be obtained at very low operating temperatures, for example from 40° C. to about 100° C.

What is claimed is:

1. A process for fractionating a mixture of macromolecular material comprising
    (a) placing a solution of said material in contact with a first upstream side of a fluid permeable anisotropic membrane comprising a barrier layer of from 0.1 to 5.0 microns in thickness and having an average pore diameter of from 1 to 500 millimicrons and a support layer of a coarsely porous structure which support layer offers no substantial additional resistance to fluid which has passed through said barrier layer, applying a pressure to said solution which pressure is greater than pressure being exerted against a second downstream side of said membrane to force a molecular weight fraction of said macromolecular material through said membrane.

2. A process as defined in claim 1 wherein said applied pressure is less than 100 p.s.i.g.

3. A process as defined in claim 1 wherein said molecular weight of said fraction passing through the membrane is up to about 110,000.

4. A process as in claim 1 wherein said mixture of macromolecular material is a solution of polyvinylpyrrolidone and comprising the additional step of removing a physiologically-intolerable low-molecular-weight fraction from said solution.

5. A process as defined in claim 1 comprising the additional steps of increasing said applied pressure on said upstream side of said membrane to achieve a further fraction of said macromolecular material.

6. A process as defined in claim 1 wherein said anisotropic membranes comprise a pressure-resistant skin layer having pores of from about 1 to 500 millimicrons in effective average diameter.

7. A process as defined in claim 1 and carried out at a temperature between 40° C. and 100° C.

8. A process as defined in claim 7 wherein said removal of low-molecular weight fraction from said solution is achieved by passing said low molecular-weight fraction through an anisotropic membrane.

References Cited

UNITED STATES PATENTS

| | | | |
|---|---|---|---|
| 2,864,506 | 12/1958 | Hiskey | 210—22 X |
| 3,228,876 | 1/1966 | Mahon | 210—22 |

FOREIGN PATENTS

| | | |
|---|---|---|
| 84,684 | 4/1958 | Denmark. |

OTHER REFERENCES

Gropper et al., "Collective Review, Plasma Expanders," from Surg., Gyn. & Obst., December 1952, vol. 95, No. 6, pp. 521–534 relied on.

Kaufman, "Polyvinyl Pyrrolidone—a Blood Plasma Expander," from Manufacturing Chemist, January 1952, pp. 5–7 relied on.

Lyman, "New Synthetic Membranes for the Dialysis of Blood," from Trans. Amer. Soc. Artif. Int. Organs, vol. X, 1964, pp. 17–21 relied on.

Markle et al., "Development of Improved Membranes for Artificial Kidney Dialysis," from Trans. Amer. Soc. Artif. Int. Organs, vol. X, 1964, pp. 22–25 relied on.

Ravdin, "Plasma Expanders," from J.A.M.A., Sept. 6, 1952, vol. 150, No. 1, pp. 10–13 relied on.

Michaels, "Polyelectrolyte Complexes," from I. & E. Chem., vol. 57, No. 10, October 1965, 82 pp., pp. 32–40 relied on.

REUBEN FRIEDMAN, Primary Examiner

F. A. SPEAR, Jr., Assistant Examiner

U.S. Cl. X.R.

210—321, 500

PO-1050
(5/69)

UNITED STATES PATENT OFFICE
CERTIFICATE OF CORRECTION

Patent No. 3,526,588     Dated September 1, 1970

Inventor(s) Alan S. Michaels and Richard W. Baker

It is certified that error appears in the above-identified patent and that said Letters Patent are hereby corrected as shown below:

Column 4, line 14, "cohensive" should be
--cohesive--;

Column 5, in Table II, below "1.....NaCNS",
insert --1.....CuNO$_2$--;

Column 7, after the table in Table V, insert
the words --EXAMPLE 3--.

Signed and sealed this 3rd day of November 1970

(SEAL)
Attest:

EDWARD M. FLETCHER, JR.
Attesting Officer

WILLIAM E. SCHUYLER, JR.
Commissioner of Patents